(12) United States Patent
Halsey et al.

(10) Patent No.: US 7,327,303 B1
(45) Date of Patent: Feb. 5, 2008

(54) HYBRID RADAR RECEIVER

(75) Inventors: J. Doss Halsey, Severna Park, MD (US); Katsumi Ohnishi, Centreville, VA (US)

(73) Assignee: Information Systems Laboratories, Inc., San Diego, CA (US)

( * ) Notice: Subject to any disclaimer, the term of this patent is extended or adjusted under 35 U.S.C. 154(b) by 0 days.

(21) Appl. No.: 11/692,073

(22) Filed: Mar. 27, 2007

(51) Int. Cl.
*G01S 7/40* (2006.01)
*G01S 7/02* (2006.01)
*G01S 13/00* (2006.01)

(52) U.S. Cl. ............ 342/20; 342/13; 342/89; 342/91; 342/175; 342/195

(58) Field of Classification Search ........ 342/13–21, 342/89, 91, 147, 175, 195
See application file for complete search history.

(56) References Cited

U.S. PATENT DOCUMENTS

| | | | | |
|---|---|---|---|---|
| 3,077,601 A | * | 2/1963 | Newhouse | 342/20 |
| 3,660,844 A | * | 5/1972 | Potter | 342/20 |
| 4,321,601 A | | 3/1982 | Richman | |
| 4,502,938 A | | 3/1985 | Covington et al. | |
| 4,760,381 A | | 7/1988 | Haag | |
| 4,906,999 A | * | 3/1990 | Harrah et al. | 342/20 |
| 4,956,644 A | * | 9/1990 | Leahy et al. | 342/20 |
| 5,068,813 A | | 11/1991 | Thoen | |
| 5,122,803 A | | 6/1992 | Stann et al. | |
| 5,151,701 A | * | 9/1992 | Valentine et al. | 342/20 |
| 5,206,651 A | * | 4/1993 | Valentine et al. | 342/20 |
| 5,323,103 A | * | 6/1994 | Choate et al. | 342/13 |
| 5,419,197 A | | 5/1995 | Ogi et al. | |
| 5,424,742 A | | 6/1995 | Long et al. | |
| 5,430,445 A | | 7/1995 | Peregrim et al. | |
| 5,461,383 A | * | 10/1995 | Ono et al. | 342/20 |
| 5,550,546 A | * | 8/1996 | Noneman et al. | 342/13 |
| 6,028,343 A | | 2/2000 | Chan et al. | |
| 6,043,771 A | * | 3/2000 | Clark et al. | 342/13 |
| 6,060,878 A | * | 5/2000 | Doi | 342/20 |
| 6,448,921 B1 | * | 9/2002 | Tsui et al. | 342/13 |

\* cited by examiner

*Primary Examiner*—Bernarr E. Gregory
(74) *Attorney, Agent, or Firm*—Nydegger & Associates

(57) ABSTRACT

A hybrid radar receiver includes an antenna array for receiving an input signal having a radar signal from a signal emitter. Each array element outputs an analog signal on a respective data channel. For each data channel, an activatable A/D converter is provided. A dedicated hardware circuit, which typically includes a detector/log video amplifier that is coupled to a threshold/pulse digitizer, is included to determine when a radar pulse is being received. When the circuit determines that a pulse is being received, the circuit activates each A/D converter to generate a digital signal on each channel. When a pulse is not currently being received, the circuit deactivates each A/D converter and digital signals are not produced. Pulse parameter(s) generated by the hardware circuit and the digital signals on each channel are sent to a software equipped processor which implements a signal emitter identification algorithm.

20 Claims, 1 Drawing Sheet

HYBRID RADAR RECEIVER

FIELD OF THE INVENTION

The present invention pertains generally to radar receiver architectures. More particularly, the present invention pertains to a radar receiver architecture for receiving and analyzing wideband radar signals. The present invention is particularly, but not exclusively, useful as a hybrid radar receiver which reduces processor load by digitizing only a selected portion of an incoming wideband signal.

BACKGROUND OF THE INVENTION

The modern "electronic warfare" environment often includes a plethora of radar signals of varying frequency and bandwidth. Continuous digital sampling of this wideband signal environment to identify and characterize radar pulse trains on the received radar signals inevitably requires a high data sampling rate. This results in enormous amounts of data to be buffered and processed. Using current receiver architectures, the processing of this large amount of data generally requires an extremely complex, costly processor. On the other hand, to keep up in real time with dense electronic warfare environments when standard processor architectures are used, this large amount of data reduces processor performance and tends to limit the types of processing algorithms that can be employed to detect and identify targets.

With regard to processing algorithms, novel methods for characterizing a radar pulse to identify a radar emitter have been recently developed. Typically, in these methods specific data parameters can be extracted from the incoming radar signal and used to identify and classify a non-stationary signal emitter. More specifically, this process includes the step of deinterleaving the input signal into its constituent pulse trains using either an "identify-and-subtract" technique or a Hilbert-Huang transform (HHT). After the deinterleaving process is complete, a Hilbert transform is applied to a selected pulse train to characterize a single radar pulse from the pulse train.

The characterization described above typically includes estimating pulse modulation, bandwidth, pulsewidth and amplitude. Once the pulse, and hence the input signal, is characterized, the characterization data is used to identify and classify the signal emitter. Thus, in addition to decreasing overall processor load, it is also highly desirable to match the radar receiver architecture to the specific computational algorithms that will be used to identify and classify emitters/targets. In this manner, the receiver can be configured to extract only the selected data required by the specific computational algorithm.

Another factor that must be considered when designing a receiver architecture is throughput speed. In this regard, it is known that hardware circuits can perform some data computations much quicker than software equipped processors. For example, in some cases, dedicated hardware circuits can perform a computation in as little as two or three clock cycles, whereas the same computation may require a time duration of several orders of magnitude greater when performed by a software equipped processor.

In light of the above, it is an object of the present invention to provide a radar receiver architecture which reduces processor load by digitizing only a selected portion of an incoming wideband signal. Still another object of the present invention is to provide a radar receiver architecture that can be selectively matched to a specific computational algorithm. Yet another object of the present invention is to provide a radar receiver architecture for receiving and analyzing wideband radar signals that is relatively efficient, is relatively simple to use, and is comparatively cost effective.

SUMMARY OF THE INVENTION

The present invention is directed to a hybrid radar receiver for receiving an input signal that includes a radar signal from at least one signal emitter. For the present invention, the receiver includes a plurality of antenna elements that are arranged as an antenna array. Each element in the array receives the input signal and generates an analog signal output on a respective data channel. For each data channel, an analog-to-digital (A/D) converter is provided to convert the analog signal on the channel to a digital signal. For the radar receiver, each A/D converter is switchable between an active state in which the converter generates a digital output and a non-active state in which the converter generates no output. More specifically, as detailed further below, all of the A/D converters are switched into the active state during periods when a pulse is being received and are switched into the non-active state during periods when a pulse is not being received. Thus, digital outputs are only generated during periods when pulses are received. This arrangement allows for a reduced processor load while maintaining the ability to coherently process across multiple antenna channels.

To determine when a pulse is being received, the hybrid radar receiver includes a relatively fast, dedicated hardware circuit. For the present invention, the circuit is electrically connected to the antenna such that an analog signal from one of the antenna elements is input to the dedicated hardware circuit. In one embodiment of the receiver, the hardware circuit includes a detector/log video amplifier that is coupled to a threshold/pulse digitizer. With this cooperation of structure, the circuit can be used to extract one or more pulse parameters from the analog signal. Typically, the circuit extracts a time of arrival (TOA), a pulsewidth and a pulse amplitude from the analog signal.

Once values for the parameters have been extracted from the analog signal, the hardware circuit compares these values to threshold values to determine whether a pulse is being received. When the circuit determines that a pulse is being received, the circuit activates each A/D converter to generate a digital signal on each channel. On the other hand, when the circuit determines that a pulse is not currently being received, the circuit deactivates each A/D converter, and as a consequence, digital signals are not produced on each channel.

For the present invention, a software equipped processor is operably connected to each A/D converter and the hardware circuit to receive the pulse parameter(s) and the digital signal on each channel. The processor then uses the pulse parameter(s) and the digital signals as inputs to a signal emitter identification algorithm.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
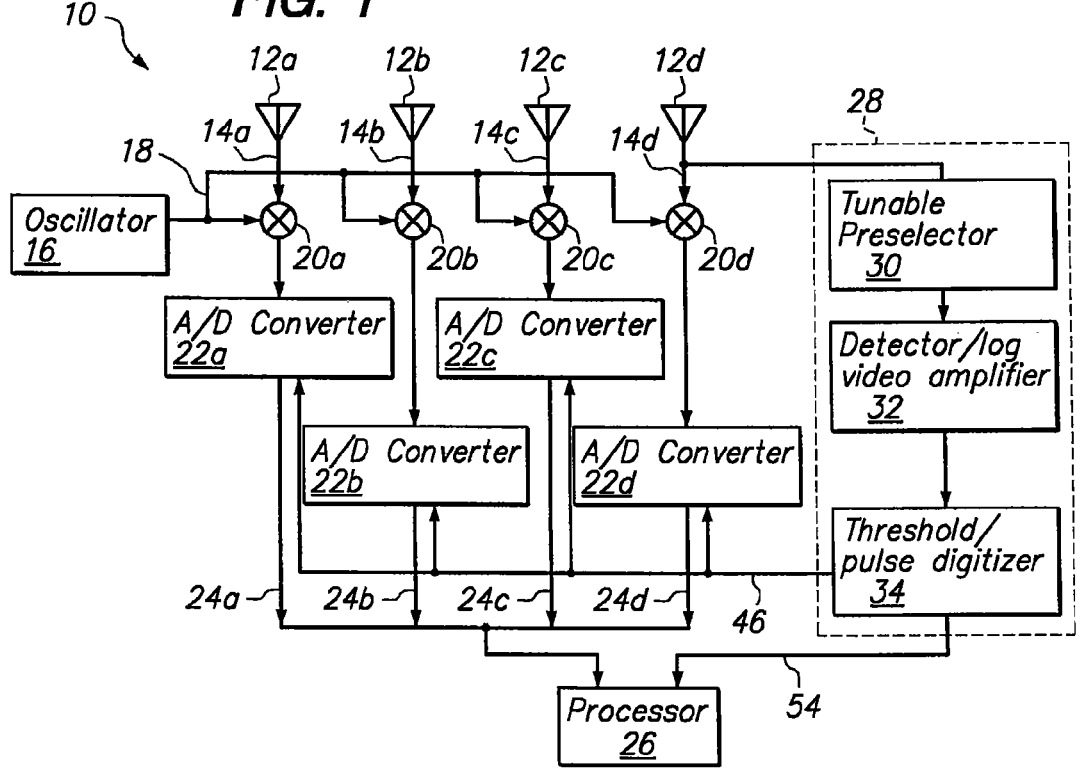
FIG. 1 is a schematic of a hybrid radar receiver.

A hybrid radar receiver for identifying a signal emitter (e.g. target) is shown in FIG. 1 and is generally designated 10. As shown, the system 10 includes an antenna array having a plurality of antenna elements 12a-d. Although four antenna elements 12 are shown for the antenna array, it is to be appreciated that as few as two, and as many elements 12 as desired can be used for the receiver 10. It is further shown that each antenna element 12a-d produces an analog signal output on a respective channel 14a-d. A common local oscillator 16 is provided to mix a common oscillator signal 18 with the data on each channel 14a-d at respective mixing circuits 20a-d, as shown. This mixing is typically performed to down convert each signal from a respective antenna element 12a-d to a preselected intermediate frequency, or in some cases, to baseband.

FIG. 1 further shows that the receiver 10 includes an activatable analog-to-digital (A/D) converter 22a-d for each channel 14a-d. Digital signals from each converter 22a-d are then routed via cables 24a-d to a software equipped processor 26. For the hybrid radar receiver 10, a relatively fast, dedicated hardware circuit 28 is provided. As shown, the circuit 28 is electrically connected to the antenna element 12d to allow sampling of the analog signal on channel 14d by the dedicated hardware circuit 28. For the embodiment shown, the hardware circuit 28 includes a tunable preselector 30, a detector/log video amplifier 32 and a threshold/pulse digitizer 34. With this structure, the hardware circuit 28 can very quickly extract pulse parameters including a time of arrival (TOA), a pulsewidth and a pulse amplitude from the analog signal. In addition, the hardware circuit 28 determines whether a radar pulse is being received. The tunable preselector 30 limits this procedure to one or more specific predetermined frequency bands within the analog signal on channel 14d.

Figure 2:
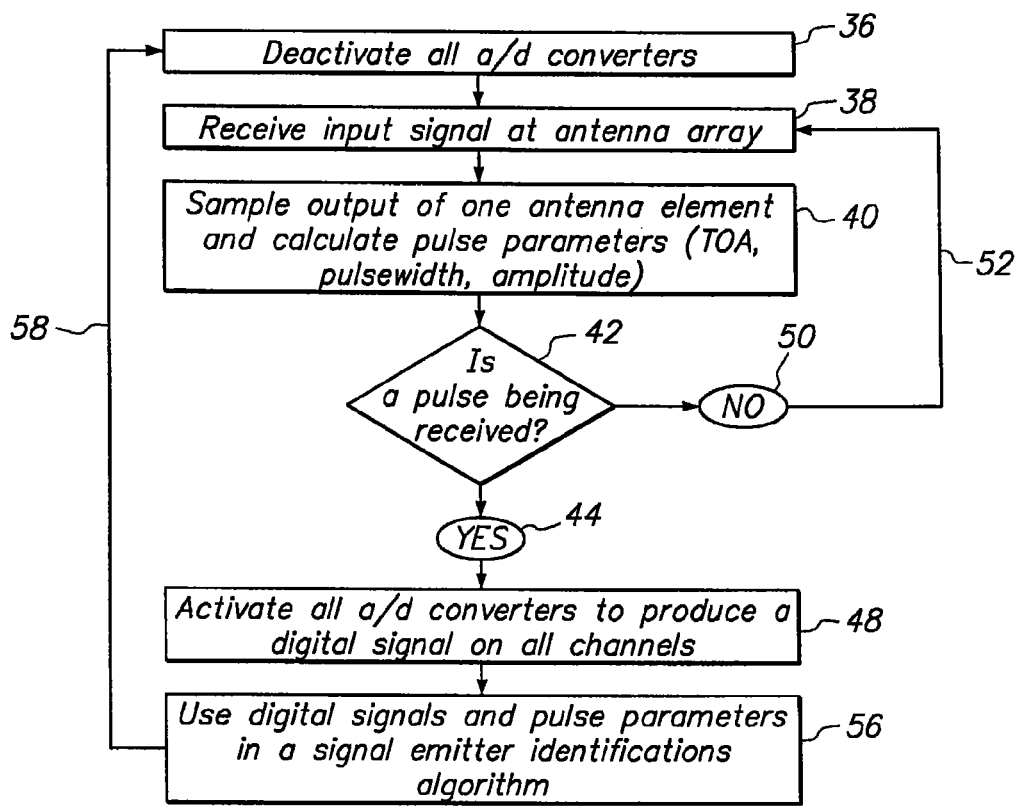
FIG. 2 is a logic flow diagram illustrating the signal and data paths for the hybrid radar receiver.

The operation of the receiver 10 can best be appreciated by cross-referencing FIG. 1 with FIG. 2. To begin, as shown in FIG. 2, the receiver 10 is initially configured with all of the A/D converters 22a-d in a deactivated state (box 36). The consequence of this is that digital signals are not present in cables 24a-d (FIG. 1). With the A/D converters 22a-d in a deactivated state, an input signal is received at each antenna element 12a-d in the array (box 38). Typically, as contemplated for the present disclosure, the input signal can in some cases be a nonlinear, wideband signal containing radar signals from one or more signal emitters (e.g. radar signals scattered by targets).

Comparing FIGS. 1 and 2 it can be seen that the hardware circuit 28 samples the analog signal output on channel 14d and calculates pulse parameters including a time of arrival (TOA), a pulsewidth and a pulse amplitude (box 40). These pulse parameters are then compared to threshold values by the hardware circuit 28 to determine whether a pulse is being received (decision box 42). When the circuit 28 determines that a pulse is being received (box 44), the hardware circuit 28 activates each A/D converter 22a-d via control wire 46 to generate a digital signal in each cable 24a-d (box 48). Continuing with decision box 42, when the circuit 28 determines that a pulse is not currently being received (box 50), the circuit 28 continues to receive and analyze the input signal (arrow 52 and box 38) until a pulse is received. With this arrangement, digital data is only created and sent to the software equipped processor 26 during periods when pulses are received. During pulse receipt, the pulse parameter(s) are sent to the processor 26 via cable 54 and used together with the digital signals in cables 24a-d as inputs to a signal emitter identification algorithm (box 56). Thus, the processor 26 does not need to recalculate the pulse parameter(s) calculated by the hardware circuit 28. The procedure shown in FIG. 2 then repeats, typically in a continuous manner as illustrated by arrow 58.

For the receiver 10, simple pulse repetition interval (PRI) sort algorithms can be used to perform preliminary deinterleaving. In addition, more complex algorithms can be invoked on the pulses left over from the first-pass deinterleaving process. The sampled data from multiple receive antenna elements 12a-d can enable powerful array processing techniques to be performed, including, but not limited to, high resolution AoA and adaptive interference cancellation. The sampled data can also be used to estimate additional emitter parameters (digitally) to aid in deinterleaving. For example, since frequency is a primary sort parameter, frequency estimation on a pulse-by-pulse basis can, in some cases, greatly aid the deinterleaving process without the need for an instantaneous frequency measurement (IFM) module. Typically, AoA estimation on a pulse-by-pulse basis is more computationally demanding and may not be required on every pulse. The detection of a pulse-on-pulse condition can also aid in the deinterleaving process by providing information about potentially corrupted pulse parameters and can be used to flag a pulse for a later, more detailed analysis.

Further, the receiver 10 enables direction of arrival (DOA) estimation and other multi-antenna processes including interference cancellation, space-time adaptive processing (STAP), high resolution angle estimation, sidelobe rejection, and the like. It is noted that it is unnecessary to continuously digitize all pulses from an emitter to calculate direction of arrival because the pulses all come from the same direction. Also, the receiver 10 can be used in a mode where the high speed digitization on the channels 24 can be cued to intercept a single pulse of a given emitter.

While the Hybrid Radar Receiver as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A hybrid radar receiver for receiving an input signal that includes a radar signal from at least one signal emitter, said receiver comprising:

a plurality of antenna elements arranged as an array to receive the input signal, with each antenna element configured to output an analog signal on a respective data channel;

a plurality of analog-to-digital (A/D) converters, each converter activatable to receive an analog signal on a respective data channel and convert the analog signal to a digital signal;

a dedicated hardware circuit for operating on an analog signal from one of the antenna elements to extract at least one pulse parameter from the analog signal, said hardware circuit configured to compare the extracted parameter to a parameter threshold and use a comparison result to selectively activate said plurality of A/D converters and produce a digital signal on each channel; and a software equipped processor operably connected to receive the digital signal on each channel, said processor configured to use said digital signals in a signal emitter identification algorithm.

2. A receiver as recited in claim 1 wherein said pulse parameter is selected from the group consisting of a time of arrival (TOA), a pulsewidth, and a pulse amplitude.

3. A receiver as recited in claim 1 wherein said receiver estimates a direction of arrival (DOA) of the input signal.

4. A receiver as recited in claim 1 wherein said digital signal on each channel is cued to intercept a single pulse of the signal emitter.

5. A receiver as recited in claim 1 wherein said hardware circuit comprises a tunable preselector.

6. A receiver as recited in claim 1 wherein said hardware circuit comprises a detector/log video amplifier coupled to a threshold/pulse digitizer.

7. A receiver as recited in claim 1 further comprising a common local oscillator for mixing each analog signal on a respective data channel with a common oscillator signal.

8. A hybrid radar receiver for receiving an input signal that includes a radar signal from at least one signal emitter, said receiver comprising:

a plurality of antenna elements arranged as an array to receive the input signal, with each antenna element configured to output an analog signal on a respective data channel;

a means for converting each analog signal on a respective data channel to a respective digital signal;

a dedicated hardware circuit for operating on an analog signal from one of the antenna elements to determine when a pulse is received and for controlling said converting means to only generate digital signals during pulse receipt; and a software equipped processor operably connected to receive the digital signal on each channel, said processor configured to use said digital signals in a signal emitter identification algorithm.

9. A receiver as recited in claim 8 wherein said dedicated hardware circuit extracts at least one pulse parameter from the analog signal, and wherein said circuit is configured to compare the extracted parameter to a parameter threshold and use a comparison result to selectively control the converting means.

10. A receiver as recited in claim 9 wherein said processor uses the pulse parameter in the signal emitter identification algorithm.

11. A receiver as recited in claim 9 wherein said pulse parameter is a time of arrival (TOA).

12. A receiver as recited in claim 9 wherein said pulse parameter is a pulsewidth.

13. A receiver as recited in claim 9 wherein said pulse parameter is a pulse amplitude.

14. A receiver as recited in claim 8 wherein said hardware circuit comprises a tunable preselector.

15. A receiver as recited in claim 8 wherein said hardware circuit comprises a detector/log video amplifier coupled to a threshold/pulse digitizer.

16. A receiver as recited in claim 8 further comprising a common local oscillator for mixing each analog signal on a respective data channel with a common oscillator signal.

17. A receiver as recited in claim 8 wherein said converting means comprises a plurality of A/D converters.

18. A method for processing an input signal that includes a radar signal from at least one signal emitter, said method comprising the steps of:

arranging a plurality of antenna elements as an array to receive the input signal, with each antenna element configured to output an analog signal on a respective data channel;

operably connecting a dedicated hardware circuit to one of the antenna elements to receive an analog signal therefrom and determine when a pulse is received;

activating a plurality of A/D converters to convert each analog signal on a respective data channel to a respective digital signal during pulse receipt;

deactivating said plurality of A/D converters during a period of pulse non-receipt; and running a signal emitter identification algorithm using a software equipped processor that is connected to receive the digital signal on each channel.

19. A method as recited in claim 18 wherein said dedicated hardware circuit extracts at least one pulse parameter from the analog signal and compares the extracted parameter to a parameter threshold to determine when a pulse is received.

20. A method as recited in claim 18 wherein said at least one pulse parameter is selected from the group of pulse parameters consisting of a time of arrival (TOA), a pulsewidth, a pulse amplitude, and combinations thereof.

\* \* \* \* \*